United States Patent [19]

Mao

[11] 4,115,302

[45] Sep. 19, 1978

[54] SUBSTITUTED MORPHOLINE CATALYST FOR POLYURETHANE FOAM

[75] Inventor: Chung-Ling Mao, Sandy Hook, Conn.

[73] Assignee: Uniroyal, Inc., New York, N.Y.

[21] Appl. No.: 815,328

[22] Filed: Jul. 13, 1977

[51] Int. Cl.$^2$ .................... C07D 295/00; C08G 18/16
[52] U.S. Cl. .................... 521/115; 544/145; 544/146; 528/53
[58] Field of Search .................... 544/145, 146; 260/2.5 AC, 77.5 AC

[56] References Cited

U.S. PATENT DOCUMENTS

| | | | |
|---|---|---|---|
| 2,530,070 | 11/1950 | Morris et al. | 544/145 |
| 3,622,542 | 11/1971 | Klouman et al. | 260/2.5 AC |
| 3,786,005 | 1/1974 | Bechara et al. | 260/2.5 AC |
| 3,816,339 | 6/1974 | Raden | 260/2.5 AC |
| 3,821,131 | 6/1974 | Priest et al. | 260/2.5 AC |
| 3,836,488 | 9/1974 | Pruitt et al. | 260/2.5 AC |
| 3,845,098 | 10/1974 | Massie et al. | 260/2.5 AC |
| 3,862,150 | 1/1975 | Bechara et al. | 260/77.5 AC |

OTHER PUBLICATIONS

Chemical Abstracts, vol. 83, No. 21, Nov. 24, 1975, p. 178957u.
Chemical Abstracts, vol. 85, No. 7, Aug. 16, 1976, p. 46537P.

*Primary Examiner*—Ronald W. Griffin
*Attorney, Agent, or Firm*—James J. Long

[57] ABSTRACT

N-(1,1-dioxotetrahydro-3-thienyl)-2,6-dialkylmorpholines, useful as catalysts in making polyurethane foam.

4 Claims, No Drawings

SUBSTITUTED MORPHOLINE CATALYST FOR POLYURETHANE FOAM

This invention relates to certain substituted morpholines, and to a method of making polyurethane foam using such substituted morpholines as catalysts, and to polyurethane foam so produced.

More particularly, the invention relates to novel N-(1,1-dioxotetrahydro-3-thienyl)-2,6-dialkylmorpholines which can be represented by the following formula

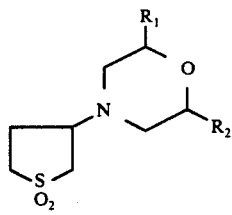

wherein $R_1$ and $R_2$ are alkyl radicals having from 1 to 4 carbon atoms and can be either alike or different. Said compositions are useful as catalysts or co-catalysts in the manufacture of polyurethane foam.

Polyurethane foams have been finding wider and wider uses in industry and it has been recognized that the two major components, a polyisocyanate and a polyhydroxy compound, are not the only materials which affect the ultimate properties of the formed polyurethane; the properties are also a function of the blowing agent, the reaction temperature, the catalyst and the chain extender used.

Numerous tertiary amines or mixtures of these amines have been proposed as catalysts for this reaction and among them, there are those that produce desirable properties of the resulting foam even at room temperature polymerization cure and post-cure. However, catalyst systems of this general type have some drawbacks in that they are quite volatile and are toxic.

It is thus an object of this invention to provide a catalyst system which overcomes these shortcomings known heretofore in conventional catalyst systems. Surprisingly, the heterocyclic morpholines of the formula stated above have been found to be useful as catalysts for manufacturing polyurethane foams. In particular, the heterocyclic morpholines of the present invention produce essentially no odor at curing temperatures. An even more important feature of the present invention is that when the novel catalyst is used, preferably along with 1,4-diazobicyclo[2.2.2] octane or when mixed with a conventional N-alkyl morpholine catalyst system, relatively long cream and rise times are obtained as noted in the table hereinafter. Further, the physical properties of the foam produced with the present catalyst are equal to or better than the physical properties obtained with a conventional N-alkyl morpholine system. In addition, the polyurethane foams also have more open-cell structure and essentially no shrinkage.

The novel compounds of this invention are made by a one step synthesis by reacting a 2,6-dialkylmorpholine (I) and a dihydrothiophene-1,1-dioxide (II or III) according to the following reaction scheme:

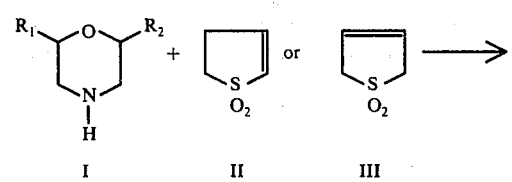

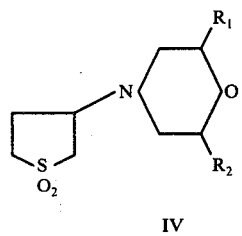

In carrying out this reaction, II or III is reacted with an excess of 2,6-dialkylmorpholine (I) in a polar solvent to give product IV, which is N-(1,1-dioxotetrahydro-3-thienyl)-2,6-dialkylmorpholine. Generally, the procedure is to dissolve II or III and I in a suitable solvent such as ethyl alcohol and the resultant solution is kept at 50°–90° C. for 4 to 24 hours. When the reaction is complete, the solvent and the excess 2,6-dialkylmorpholine are removed by vacuum.

Typical N-(1,1-dioxotetrahydro-3-thienyl)-2,6-dialkylmorpholines of the invention are N-(1,1-dioxotetrahydro-3-thienyl)-2,6-dimethylmorpholine, N-(1,1-dioxotetrahydro-3-thienyl)-2,6-diethylmorpholine, N-(1,1-dioxotetrahydro-3-thienyl-2,6-di(n- or iso-)propylmorpholine, N-(1,1-dioxotetrahydro-3-thienyl)-2,6-di(n-, iso, or tert.-)butylmorpholine, N-(1,1-dioxotetrahydro-3-thienyl)-2-methyl-6-isopropylmorpholine, N-(1,1-dioxotetrahydro-3-thienyl)-2-tert. butyl-6-ethylmorpholine, and the like. These new compounds are all liquids and soluble in the polyol component of the polyurethane formulation, making them eminently suitable for the present purpose, in contrast to the known compound N-(1,1-dioxotetrahydro-3-thienyl)morpholine, i.e., a compound as in the above formula wherein $R_1$ and $R_2$ are hydrogen rather than $C_1$–$C_4$ alkyl. Such known compound (U.S. Pat. No. 2,530,070, Morris, et al., Nov. 14, 1950) is a solid at room temperature and insoluble in the polyol employed, and thus it is not operable in the present process.

The heterocyclic morpholine catalysts of this invention are used in small concentrations, generally from 0.01 percent to about 2.0 percent by weight based on the total weight of the reaction mixture. Preferably, from 0.15 to 1.0 percent is used.

To employ the present compounds as catalysts for polyurethanes the compounds may simply be substituted at least in part for the conventional catalysts in any conventional polyurethane formulation of the kind ordinarily employing a catalyst. The foam-forming reaction may be carried out under the same conditions as are usually employed in conventional polyurethane foam manufacture. Polyurethane systems of the so-called one-shot type, or of the prepolymer type, may be employed, and the final foam may be rigid or flexible, elastomeric or otherwise. As is well understood by those skilled in the art, polyurethane forming systems conventionally involve a combination of at least one long chain polyol (whether a polyester polyol, a polyether polyol or a polyhydrocarbon polyol) and at least one organic polyisocyanate, whether a diisocyanate or a polyisocyanate of higher functionability, of aliphatic, cycloaliphatic, or aromatic type. The relative proportions of polyol and polyisocyanate may be as in conventional practice appropriate to the particular kind of final product desired and the processing or fabricating method chosen.

The polyether types of polyols employed in making polyurethanes include, as is well known to those skilled in the art, poly(oxyalkylene) glycols [e.g., poly(oxyethylene) glycol, poly(oxypropylene) glycol, poly(oxytetramethylene)glycol, etc.] and higher polyether polyols, such as triols [e.g., poly(oxypropylene)triol], including polyether polyols of higher functionality than three [e.g., poly(oxypropylene adducts of pentaerythritols) and poly(oxypropylene adducts of sorbitol)]. Mention may be made of such polyether polyols as poly(oxypropylene)-poly(oxyethylene)glycol, poly(oxypropylene) adducts of trimethylol propane, poly(oxypropylene)-poly(oxyethylene) adducts of trimethylolpropane, poly(oxypropylene) adducts of 1,1,6-hexanetriol, poly(oxypropylene)-poly(oxyethylene) adducts of ethylenediamine, poly(oxypropylene) adducts of ethanolamine, and poly(oxypropylene) adducts of glycerine.

The polyester types of polyols used in making polyurethanes are likewise well known in the art and require no detailed description here. It will be understood that they include chain extended polyesters made from a glycol (e.g., ethylene and/or propylene glycol) and a saturated dicarboxylic acid (e.g., adipic acid). By way of non-limiting example there may be mentioned poly(ethylene adipate)glycol, poly(propylene adipate)glycol, poly(butylene adipate)glycol, poly(caprolactone) glycol, poly(ethylene adipate-phthalate)glycol, poly(neopentyl sebacate)glycol, etc. Small amounts of tri-alcohols such as trimethylolpropane or trimethylolethane may be included in the polyester preparation. Polyester polyols with functionalities of three or more [e.g., glycerides of 12-hydroxystearic acid] are also useful. Suitable polyester polyols include those obtainable by reacting such polyols as 1,4-butanediol, hydroquinone bis(2-hydroxyethyl)ether, ethylene glycol, diethylene glycol, triethylene glycol, propylene glycol, dipropylene glycol, 2-methyl-2-ethyl-1, 3-propanediol, 2-ethyl-1,3-hexanediol, 1,5-pentanediol, thiodiglycol, 1,3-propanediol, 1,3-butanediol, 2,3-butanediol, neopentyl glycol, 1,2-dimethyl-1,2-cyclopentanediol, 1,2-cyclohexanediol, 1,2-dimethyl-1, 2-cyclohexanediol, glycerol, trimethylol propane, trimethylol ethane, 1,2,4-butanetriol, 1,2,6-hexanetriol, pentaerythritol, dipentaerythritol, tripentaerythritol, anhydroaneaheptitol, mannitol, sorbitol, methylglucoside, and the like, with such dicarboxylic acids as adipic acid, succinic acid, glutaric acid, azelaic acid, sebacic acid, malonic acid, maleic acid, fumaric acid, phthalic acid, isophthalic acid, terephthalic acid, tetrachlorophthalic acid, and chlorendic acid; the acid anhydrides and acid halides of these acids may also be used.

Among the polyhydrocarbyl polyols conventionally employed for making polyurethanes there may be mentioned by way of non-limiting example such materials as poly(butadiene)polyols, poly(butadiene-acrylonitrile) polyols and poly(butadiene-styrene)polyols.

The above polyols typically have a molecular weight of about 180 to 8000.

Conventional polyisocyanates used in polyurethane manufacture include, as is well known, aliphatic polyisocyantes, whether open chain, cycloaliphatic or araliphatic. Examples of aliphatic polyisocyanates conventionally employed are trimethylene diisocyanate, tetramethylene-1,4-diisocyanate, hexamethylene-1,6-diisocyanate, 1-methyl-2,4-and 1-methyl-2,6-diisocyanatocyclohexane and mixtures thereof, p-xylylene diisocyanate and m-xylylene diisocyanate (XDI [not a trademark]) and mixtures thereof, 4,4-diisocyanatodicyclohexylmethane, isophorone diisocyanate, 2,2,4- and 2,4,4-trimethylhexamethylene diisocyanate, and the like.

Similarly, the aromatic polyisocyanates are suitable and include, by way of non-limiting example, such bodies as 2,4-toluene diisocyanate and 2,6-toluene diisocyanate and mixtures thereof (TDI [not a trademark], including crude and polymeric forms), 4,4'-diphenylmethane diisocyanate (MDI [not a trademark], including crude and polymeric forms), p-phenylene diisocyanate, 2,4,6-tolylene triisocyanate, 4,4'4''-triphenylmethane triisocyanate, 2,2-bis(p-isocyanatophenyl)-propane, polymeric methylene bis(phenyl-4-isocyanate) (e.g., PAPI [Trademark]), naphthalene-1,5-diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, and the like. Mixtures of two or more of such diisocyanates may also be used. Triisocyanates typically obtained by the reaction of three moles of an arylene diisocyanate with one mole of triol — for example, the reaction product formed from three moles of tolylene diisocyanate and one mole of hexanetriol or of trimethylol propane, may be employed.

The foam formulation may further include the other ingredients usual in making polyurethane foam, notably blowing agent, chain extender, surfactants, etc. Water may be used as a blowing agent, and/or a volatile organic liquid may be used (e.g., boiling within the range of from 50° to 150° F.) such as pentane, trichlorofluoromethane, trichloromethylene, tetrachloroethylene, trichlorotrifluoroethane, trichloroethane, methylene chloride, dibromotetrafluroethane, carbon tetrachloride, etc. The chain extenders are typically diamines and diols (see, for example: U.S. Pat. Nos. 3,233,025 Foye et al, Feb. 1, 1966 [col. 4, lines 20–26]; 3,620,905, Alramjian, Nov. 16, 1971 [col. 2, lines 53–59]; and 3,718,622, Lohse et al, Feb. 27, 1973 [col. 2 lines 10–18]). The present catalyst may be the sole catalyst used, or it may be employed as a cocatalyst along with any conventional catalyst such as N-methylmorpholine, N-ethylmorpholine, triethyl amine, triethylene diamine (Dabco [Trademark]), N,N'-bis(2-hydroxylpropyl)-2-methyl piperazine, dimethyl ethanol amine, tertiary amino alcohols, tertiary ester amines and the like.

In order to illustrate the method of preparing the catalyst and the unexpected results obtained with the novel catalyst system reference is made to the following examples.

EXAMPLE I

This example illustrates the procedure for preparing N-(1,1-dioxotetrahydro-3-thienyl)-2,6-dimethylmorpholine by reacting 2,6-dimethylmorpholine with 4,5-dihydrothiophene-1,1-dioxide. To a 500 ml round-bottom flask equipped with a condenser and stirrer was added 23.6 grams of 4,5-dihydrothiophene-1,1-dioxide, 100 ml of 95% aqueous ethanol and 24 grams of 2,6-dimethylmorpholine. The reaction mixture was heated at reflux (80°–85° C.) for 8 hours and then allowed to cool to room temperature. The solvent and the excess 2,6-dimethylmorpholine were removed by vacuum to give a yellowish viscous liquid, N-(1,1-dioxotetrahydro-3-thienyl)-2,6-dimethylmorpholine (IV).

Analysis for $C_{10}H_{19}NO_3S$: Calcd: C, 51.48; H, 8.21; N, 6.00; S, 13.74; Found: C, 51.75; H, 8.14; N, 5.89; S, 14.20

EXAMPLE II

Example I was repeated using the 2,6-dimethylmorpholine of Example I but substituting 2,5-dihydrothiophene-1,1-dioxide for the 4,5-dihydrothiophene-1,1-dioxide. The reaction mixture was heated at 60°–65° C. for 12 hours resulting in a yellowish viscous liquid product identical to the product obtained in Example I.

Analysis for $C_{10}H_{19}NO_3S$: Calcd: C, 51.48; H, 8.21; N, 6.00; S, 13.74; Found: C, 51.97; H, 8.14; N, 5.77; S, 14.25

EXAMPLE III

This example illustrates the use of N-(1,1-dioxotetrahydro-3-thienyl)-2,6-dimethylmorpholine as the catalyst for manufacturing polyurethane foam using the so-called one shot process. All ingredients, including polyol, chain extender, water or blowing agent, catalyst and surfactant were mixed together at room temperature in a small paper cup. The polyisocyanate compound was then added and the mixture stirred at 1200–2000 rpm for 10 seconds. The cream and rise time for each sample are shown in the following table. Similar foam samples were prepared according to the preceding procedure using a 1-gallon ice cream paper cup. After all the ingredients had been added and stirred for 10–20 seconds the whole mixture was then poured into a 15 × 15 × 4 inch mold and cured at 250° F. for 30 minutes. The physical properties of each foam sample were determined after a one week postcure at room temperature.

Table

|  | A | B | C | D |
| --- | --- | --- | --- | --- |
| Voranol 4701*[1] | 100.0 | 100.0 | 100.0 | 100.0 |
| YSS*[2] | 3.0 | 3.0 | 3.0 | 3.0 |
| Water | 3.5 | 3.5 | 3.5 | 3.5 |
| N-(1,1-dioxotetrahydro-3-thienyl)-2,6-dimethyl-morpholine | — | 0.5 | 0.25 | 0.5 |
| DABCO*[3] | 0.5 | 0.5 | 0.5 | 0.5 |
| NEM*[4] | 0.75 | — | — | — |
| A-1*[5] | 0.15 | 0.15 | 0.15 | — |
| T-23P*[6] | 4.0 | 4.0 | 4.0 | 4.0 |
| DC-200*[7] | 1.0 | 1.0 | 1.0 | 1.0 |
| TDI**[8] | 38.6 | 38.6 | 38.6 | 38.6 |
| MDI**[9] | 6.5 | 6.5 | 6.5 | 6.5 |
| Cream Time (sec.)[10] | 7 | 8 | 20 | 15 |
| Rise Time (sec.)[11] | 90 | 95 | 125 | 115 |
| Density (#/cu. ft.) | 2.3 | 2.4 | 2.5 | 2.3 |
| Tensile (lbs./sq. in.) | 16.0 | 16.2 | 17.3 | 15.8 |
| % Elongation (at break) | 157 | 140 | 145 | 150 |
| Tear (per linear inch) | 1.9 | 1.7 | 2.1 | 1.8 |
| Foam Shrinkage (visual) | Yes | None | None | None |

*trademarks
**not a trademark
Notes:
[1]A polypropylene glycol triol made from propylene oxide and end capped with 20–80% ethylene oxide having a molecular weight of about 4500. Material is produced by Dow Chemical Company.

This example shows that when the novel compound is used in the manufacture of polyurethane foam (samples B, C and D), the cream and rise time are improved measurably when compared with a polyurethane foam prepared with a conventional catalyst system. Physical properties are equally as good in each case and no shrinkage of the product is observed.

What is claimed is:

1. A compound of the formula

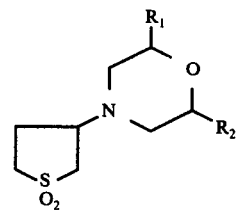

wherein $R_1$ and $R_2$ are alkyl radicals having 1 to 4 carbon atoms.

2. A compound as in claim 1 in which $R_1$ and $R_2$ are methyl.

3. In a method of making a polyurethane foam wherein a polyurethane-forming long chain polyol and a polyurethane-forming organic polyisocyanate are reacted in the presence of a catalyst and a blowing agent for the polyurethane foam, the improvement comprising using as the catalyst, at least in part, an effective amount of a compound of the formula

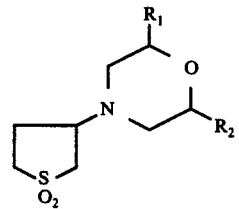

wherein $R_1$ and $R_2$ are alkyl radicals having 1 to 4 carbon atoms.

4. A method as in claim 3, in which $R_1$ and $R_2$ are methyl.

* * * * *